United States Patent [19]

Tanaka et al.

[11] Patent Number: 5,115,030

[45] Date of Patent: May 19, 1992

[54] POLYPROPYLENE RESIN COMPOSITION

[75] Inventors: Mutsuhiro Tanaka; Masahiro Sugi, both of Ichihara, Japan

[73] Assignee: Mitsui Petrochemical Industries, Ltd., Tokyo, Japan

[21] Appl. No.: 388,927

[22] Filed: Aug. 3, 1989

[30] Foreign Application Priority Data

Aug. 4, 1988 [JP] Japan .................. 63-195058

[51] Int. Cl.⁵ .................. C08L 23/10; C08L 23/16; C08L 23/20; C08L 53/00
[52] U.S. Cl. .................. 525/240; 524/528; 525/88
[58] Field of Search .................. 525/240, 88

[56] References Cited

U.S. PATENT DOCUMENTS

| | | | |
|---|---|---|---|
| 4,113,802 | 9/1978 | Matteoli et al. | 525/240 |
| 4,113,806 | 9/1978 | Watson et al. | |
| 4,251,646 | 2/1981 | Smith | 525/240 |
| 4,316,966 | 2/1982 | Mineshima et al. | 525/240 |
| 4,375,531 | 3/1983 | Ross | 525/71 |
| 4,634,740 | 1/1987 | Fujita et al. | 525/240 |
| 4,650,830 | 3/1987 | Yonekuna et al. | 525/240 |

FOREIGN PATENT DOCUMENTS

| | | |
|---|---|---|
| 0015066 | 9/1980 | European Pat. Off. |
| 77532 | 4/1983 | European Pat. Off. ............ 525/240 |
| 0133642 | 6/1985 | European Pat. Off. |
| 0168129 | 1/1986 | European Pat. Off. |
| 0198981 | 10/1986 | European Pat. Off. |
| 0228543 | 7/1987 | European Pat. Off. |
| 0294770 | 12/1988 | European Pat. Off. |
| 55-073741 | 6/1980 | Japan ............ 525/240 |
| 56-045935 | 4/1981 | Japan ............ 525/240 |
| 61-016943 | 1/1986 | Japan ............ 525/240 |

*Primary Examiner*—Carman J. Seccuro
*Attorney, Agent, or Firm*—Sherman & Shalloway

[57] ABSTRACT

A propylene resin composition contains:
(A) 50 to 99% by weight of a polypropylene resin, and
(B) 1 to 50% by weight of a rubber component, and
the rubber component (B) contains a random copolymer composition containing:
(i) an ethylenic random copolymer selected from random copolymers of ethylene with an α-olefin having 3 to 20 carbon atoms having an ethylene content of 60 to 95 mol % and a $MFR_{230°C}$ of 0.1 to 50 g/10 min. and
(ii) a propylenic random copolymer selected from random copolymers of propylene with an α-olefin having 2 to 20 carbon atoms except for propylene having a propylene content of 60 to 95 mol % and a $MFR_{230°C}$ of 0.1 to 50 g/10 min.,
at a weight ratio of (i):(ii) of from 95:5 to 20:80.

10 Claims, No Drawings

POLYPROPYLENE RESIN COMPOSITION

BACKGROUND OF THE INVENTION

1. Field of the Invention

The present invention relates to a polypropylene resin composition having an excellent heat seal strength, low temperature impact resistance and transparency, when used, for example, as a film.

2. Description of the Related Art

Polypropylene resins have an excellent rigidity, heat resistance and the like, but have a drawback of a low impact strength, particularly a low impact resistance at low temperatures. To eliminate this drawback, it is well known in the art that a rubber component comprising an ethylenic random copolymer such as ethylene-propylene random copolymer or ethylenebutene random copolymer can be mixed with a polypropylene resin.

In the above-mentioned polypropylene resin of the prior art, however, since the size of the dispersed particles of the rubber component such as ethylenepropylene random copolymer or ethylene-butene random copolymer is large, the heat seal strength cannot be enhanced, i.e., it is generally difficult to obtain a composition having a good balance between the heat seal strength and the low temperature impact resistance, and the transparency is poor.

SUMMARY OF THE INVENTION

Accordingly, the objects of the present invention are to eliminate the above-mentioned disadvantages of the prior art and to provide a polypropylene resin composition having an improved heat seal strength and having an excellent low temperature impact resistance and transparency, by reducing the size of the dispersed particles of the rubber component in the resin composition.

Other objects and advantages of the present invention will be apparent from the following description.

In accordance with the present invention, there is provided a propylene resin composition comprising:

(A) 50% to 99% by weight of a polypropylene resin, and (B) 1% to 50% by weight of a rubber component, the rubber component (B) comprising a random copolymer composition containing:
  (i) an ethylenic random copolymer selected from the group consisting of random copolymers of ethylene with an α-olefin having 3 to 20 carbon atoms having an ethylene content of 60 to 95 mol % and an $MFR_{230°\,C.}$ of 0.1 to 50 g/10 min. and
  (ii) a propylenic random copolymer selected from the group consisting of random copolymers of propylene with an α-olefin having 2 to 20 carbon atoms except for propylene having a propylene content of 60 to 95 mol % and a $MFR_{230°\,C.}$ of 0.1 to 50 g/10 min., at a weight ratio of (i):(ii) of from 95:5 to 20:80.

DESCRIPTION OF THE PREFERRED EMBODIMENTS

The polypropylene resins usable as the component (A) in the present invention include homopolymers of propylene, or random or block copolymers of propylene with other α-olefins having 2 and 4 to 20 carbon atoms, such as ethylene or 1-butene, generally containing 90 mol % or more of propylene units and having an insoluble matter in boiling n-heptane of 90% or more, preferably 93% or more.

The polypropylene resin (A) can be typically prepared by using a catalyst formed from a solid titanium catalyst component and an organometallic compound component, or a catalyst formed from both of these components and an electron donor.

Examples of the solid titanium catalyst components are titanium trichloride or titanium tetrachloride compositions prepared by various methods, or carried titanium catalyst components comprising magnesium, a halogen, an electron donor, preferably an aromatic carboxylic acid or an alkyl-containing ether and titanium as the essential components, preferably having a specific surface area of 100 m²/g or more. Particularly, those components prepared by using the latter carried catalyst components are preferable.

As the organometallic compound component, organic aluminum compounds are preferably used. Examples of such compounds are trialkylaluminum, dialkylaluminum halide, alkylaluminum sesquihalide, alkylaluminum dihalide and the like. The preferable organic aluminum compounds depend upon the kind of titanium catalyst component. Preferable examples of the electron donors are organic compounds containing, for example, nitrogen, sulfur, oxygen, silicon, and boron, such as esters, ethers and the like.

The preparations of the above-mentioned polypropylenes by using carried catalyst components are disclosed, for example, in Japanese Unexamined Patent Publication (Kokai) Nos. 50-108385, 50-126590, 51-20297, 51-28189, and 52-151691.

The ethylenic random copolymer (i) constituting the rubber component of the component (B) include random copolymers composed mainly of ethylene with other α-olefins having 3 to 20 carbon atoms. The ethylene-α-olefin copolymer usable in the present invention may have an ethylene content of 60 to 95 mol %, preferably 70 to 90 mol %, a $MFR_{230°\,C.}$ (melt index according to ASTM D 1238, 65T, 230° C.) of 0.1 to 50 g/min., preferably 0.1 to 20 g/min., a crystallinity of 40% or less, preferably 20% or less, with α-olefin having 3 to 20, preferably 3 to 10, more preferably 3 to 5 carbon atoms. These ethylenic random copolymers (i) can be used alone or as any mixture thereof.

When the ethylene content is less than 60 mol %, the resin becomes difficult to handle because, for example, of blocking. But when the ethylene content exceeds 95 mol %, a satisfactory low temperature impact resistance cannot be obtained. When $MFR_{230°\,C.}$ is outside the above range, dispersibility into the polypropylene will become difficult, and when the crystallinity exceeds 40%, a material having a satisfactory impact resistance improving effect cannot be obtained. Also, when the number of carbon atoms exceeds 20, the rubbery properties of the polymer are reduced, and therefore, the effect thereof as an impact resistance improving material is unpreferably lost.

The propylenic random copolymers (ii) are random copolymer rubbers mainly composed of propylene with other α-olefins having 2 to 20 carbon atoms except for propylene. The propylene-α-olefin copolymers usable in the present invention have a propylene content of 60 to 95 mol %, preferably 70 to 90 mol %, a $MFR_{230°\,C.}$ (melt index according to ASTM D 1238, 65T, 230° C.) of 0.1 to 50 g/min., preferably 0.1 to 20 g/min., a crystallinity of 40% or less, preferably 20% or less, with α-olefin having 2 to 20, preferably 2 to 10, more preferably 2 to 5 carbon atoms. These propylenic random copolymers (ii) may be used alone or as any mixture thereof.

The ethylenic random copolymers (i) can be prepared by randomly polymerizing a plurality of monomers by using a catalyst system comprising a soluble vanadium compound and an alkylaluminum halide compound.

Examples of the soluble vanadium compound to be used as the catalyst for polymerization include vanadium tetrachloride, vanadium oxytrichloride, vanadium triacetylacetonate, oxyvanadium triactylacetonate and the like. Examples of the alkylaluminum halide compound which is combined with the soluble vanadium compound to constitute the catalyst for polymerization include ethylaluminum dichloride, diethylaluminum monochloride, ethylaluminum sesquichloride, diethylaluminum monobromide, diisobutylaluminum monochloride, isobutylaluminum dichloride, isobutylaluminum sesquichloride, and the like.

The polymerization can be carried out in a solution or suspension, or in an intermediate region therebetween, and is all cases an inert solvent is preferably used as the reaction medium. The inert solvents usable for the polymerization include aliphatic hydrocarbons having about 3 to 12 carbon atoms, including propane, butane, pentane, hexane, heptane, octane, nonane, decane, undecane, dodecane, kerosene, or halogenated hydrocarbons such as methyl chloride, ethyl chloride, ethylene dichloride, which may be used alone or as any mixture thereof. The polymerization temperature may be generally 0° to 100° C.

The propylenic random copolymers (ii) can be prepared by randomly polymerizing a plurality of monomers by using a catalyst similar to that for the above polypropylene resin (A) and by a similar procedure.

The rubber component (B) of the present invention comprises a random copolymer composition comprising the above-mentioned ethylenic random copolymer (i) and the above-mentioned propylenic random copolymer (ii) formulated to a weight ratio (i) (ii) of 95:5 to 20:80, preferably 70:30 to 30:70.

The polypropylene resin composition of the present invention comprises 50 to 99% by weight, preferably 70 to 90% by weight, of the above-mentioned polypropylene resin (A) and 1 to 50% by weight, preferably 10 to 30% by weight of the above-mentioned rubber component (B).

In the polypropylene resin composition of the present invention, other resin components, such as polyethylene resin, can be formulated within the range which will not hinder the obtaining of the object of the present invention, and further, various additives can be formulated, such as an antioxidant, UV-ray absorber, lubricant, nucleating agent, antistatic agent, flame retardant, pigment, dye, and inorganic or organic fillers.

For the preparation of the polypropylene resin composition of the present invention, any known methods may be employed either alone or in combination, such as the method whereby the respective components are mixed by a mixing machine such as a V-type blender, ribbon blender, or Herschel mixer, or the method in which the components are kneaded by a kneading machine such as an extruder, mixing rolls, Banbury mixer, or kneader.

The polypropylene resin composition thus obtained, wherein a propylenic random copolymer exists as the rubber component, has a good dispersibility of the ethylenic random copolymer in the polypropylene resin, whereby the dispersed particle size is reduced to give a molded product such as a film having an improved heat seal strength and an excellent low temperature impact resistance and transparency.

The polypropylene resin composition of the present invention is suitable for the preparation of, for example, films and sheets for which a heat sealability, low temperature resistance and transparency are required, such as films for packaging, but can be also utilized for other molded products.

As described above, since the polypropylene resin composition of the present invention contains rubber components comprising an ethylenic random copolymer and a propylenic random copolymer, the heat sealability can be improved and a molded product having an excellent low temperature impact resistance and transparency can be obtained.

EXAMPLES

The present invention will now be further illustrated in detail by, but is by no means limited to, the following Examples, wherein "parts" are all by weight and "%" is mol %, unless otherwise noted.

EXAMPLE 1

An 85 parts amount of a polypropylene resin with an ethylene content of 2.3%, a $MFR_{230° C.}$ of 6.5 g/10 min., and a melting point (Tm) of 141° C., 5 parts of an ethylenepropylene random copolymer having an ethylene content of 81%, a $MFR_{230° C.}$ of 5.4 g/10 min., and 10 parts of a propylene-butene random copolymer having a propylene content of 81%, a $MFR_{230° C.}$ of 6.0 g/10 min., and a Tm of 110° C. were mixed in a Herschel mixer. The mixture was pelletized and then molded to obtain a film having a thickness of 60 μm. Next, the film impact at 0° C., haze, gloss and heat seal characteristics for the film obtained were measured. The film impact was measured by a pendulum-type film impact measuring device, and the heat seal characteristics were measured for the respective characteristics for the heat seal initiation temperature (H.S. initiation temperature) at which a strength of 0.5 kg/15 mm is exhibited when the film is heat sealed under a pressure of 2 kg/cm² for one second and subjected to T-peeling at 300 mm/min and heat seal strength at 150° C. (H.S. strength).

The results are shown in Table 1.

EXAMPLES 2-12 AND COMPARATIVE EXAMPLES 1-5

Films obtained from the compositions shown in Table 1 were molded and measured in the same manner as in Example 1. The results are shown in Table 1.

TABLE 1

| Composition | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Random PP 1) | 85 | 85 | 85 | 85 | 85 | 85 | 80 | 80 | 80 | 85 | 85 | 85 |
| EPR 2) | 5 | 7.5 | 10 | — | — | — | — | — | — | 5 | 7.5 | 10 |
| EBR 3) | — | — | — | 5 | 7.5 | 10 | 6.7 | 10 | 13.3 | — | — | — |
| PBR 4) | 10 | 7.5 | 5 | 10 | 7.5 | 5 | 13.3 | 10 | 6.7 | — | — | — |

TABLE 1-continued

| | | | | | | | | | | | | |
|---|---|---|---|---|---|---|---|---|---|---|---|---|
| PER 5) | — | — | — | — | — | — | — | — | 10 | 7.5 | 5 | |
| Film impact (at 0° C.) | 1700 | 2400 | 2400 | 1700 | 2000 | 1700 | 1600 | 2100 | 1800 | 1900 | 2300 | 2400 |
| Haze (%) | 0.8 | 0.9 | 0.9 | 0.8 | 0.8 | 1.0 | 0.7 | 1.0 | 2.2 | 0.8 | 0.8 | 0.9 |
| Gloss (%) | 133 | 130 | 131 | 132 | 132 | 121 | 132 | 121 | 86 | 130 | 129 | 127 |
| H.S. initiation temp. (°C.) | 132 | 132 | 131 | 135 | 133 | 132 | 130 | 128 | 126 | 130 | 131 | 131 |
| H.S. strength (at 150° C.) | 2.2 | 2.1 | 2.0 | 2.1 | 2.1 | 1.9 | 1.9 | 1.8 | 1.5 | 2.1 | 2.1 | 2.1 |

| Composition | Comparative Example | | | | |
|---|---|---|---|---|---|
| | 1 | 2 | 3 | 4 | 5 |
| Random PP 1) | 100 | 85 | 85 | 85 | 80 |
| EPR 2) | — | 15 | — | — | — |
| EBR 3) | — | — | 15 | — | 20 |
| PBR 4) | — | — | — | 15 | — |
| PER 5) | — | — | — | — | — |
| Film impact (at 0° C.) | 650 | 1900 | 1900 | 720 | 2000 |
| Haze (%) | 0.9 | 2.4 | 4.6 | 0.9 | 8.8 |
| Gloss (%) | 132 | 85 | 57 | 133 | 36 |
| H.S. initiation temp. (°C.) | 139 | 130 | 131 | 137 | 125 |
| H.S. strength (at 150° C.) | 2.4 | 0.75 | 0.74 | 2.21 | 0.6 |

1) Polypropylene resin — Ethylene content 2.3%, MFR$_{230° C.}$ 6.5 g/10 min. Tm = 141° C.
2) Ethylene-propylene random copolymer — Ethylene content 81%, MFR$_{230° C.}$ 5.4 g/10 min. Tm = —
3) Ethylene-butene random copolymer — Ethylene content 80%, MFR$_{230° C.}$ 6.7 g/10 min. Tm = —
4) Propylene-butene random copolymer — Propylene content 81%, MFR$_{230° C.}$ 6.0 g/10 min. Tm = 110° C.
5) Propylene-ethylene random copolymer — Propylene content 70%, MFR$_{230° C.}$ 2.5 g/10 min. Tm = —

We claim:

1. A polypropylene resin composition capable of providing transparent heat sealable film consisting of
   (A) 50% to 99% by weight of a polypropylene resin having a propylene unit content of 90 mol % or more and having an insoluble matter in boiling n-hexane of 90% or more;
   (B) 1% to 50% by weight of a rubber component, and optionally
   (C) one or more compounds selected from antioxidant, an UV-ray absorber, a lubricant, a nucleating agent, an antistatic agent, a flame retardant, a pigment, a dye, an inorganic filler, and an organic filler,
   said rubber component (B) consisting of a random copolymer composition containing:
   (i) an ethylene random copolymer selected from the group consisting of random copolymers of ethylene with α-olefin having 3 to 20 carbon atoms having an ethylene content of 60 to 95 mol % and MFR$_{230° C.}$ of 0.1 to 50 g/10 min., and a crystallinity of 40% or less and
   (ii) a propylene random copolymer selected from the group consisting of random copolymers of propylene with α-olefin having 4 to 20 carbon atoms, having a propylene content of 60 to 95 mol % and MFR$_{230° C.}$ of 0.1 to 50 g/10 min., and a crystallinity of 40% or less, at weight ratio of (i):(ii) of from 95:5 to 20:80.

2. A propylene resin composition as claimed in claim 1, wherein the polypropylene resin (A) is at least one member selected from the group consisting of propylene homopolymers and random and block copolymers of propylene with an α-olefin having 2 or 4 to 20 carbon atoms with a propylene component content of at least 90 mol %.

3. A propylene resin composition as claimed in claim 1, wherein the rubber component (B) consist of the ethylene random copolymer (i) and the propylene random copolymer (ii) at a weight ratio (i):(ii) of 70:30 to 30:70.

4. A propylene resin composition as claimed in claim 1, wherein the ethylene random copolymer (i) of the rubber component (B) is at least one random copolymer composed of 70 to 90 mol % of ethylene and the remainder of at least one α-olefin with 3 to 10 carbon atoms.

5. A propylene resin composition as claimed in claim 1, wherein the propylene random copolymer is at least one random copolymer composed of 70 to 90 mol % of propylene and the remainder of at least one α-olefin having 4 to 10 carbon atoms.

6. The propylene resin composition of claim 2 wherein the rubber component (B) consists of (i) at least one random ethylene copolymer composed of 70 to 90 mole percent of ethylene, and the remainder at least one α-olefin with 3 to 10 carbon atoms, and (ii) at least one random propylene copolymer composed of 70 to 90 mole percent of propylene and the remainder at least one α-olefin of from 4 to 10 carbon atoms, at a weight ratio (i):(ii) of 70:30 to 30:70.

7. The propylene resin composition of claim 6 wherein the ethylene random copolymer (i) has a crystallinity of 20% or less and the propylene random copolymer (ii) has a crystallinity of 20% or less.

8. The propylene composition of claim 1 having 70 to 90% by weight of the polypropylene resin (A) and 10 to 30% by weight of the rubber component (B).

9. The propylene composition of claim 1 wherein the propylene random copolymer (ii) is a copolymer of propylene with butene.

10. A transparent heat sealable film formed from the propylene resin composition of claim 1.

* * * * *